UNITED STATES PATENT OFFICE.

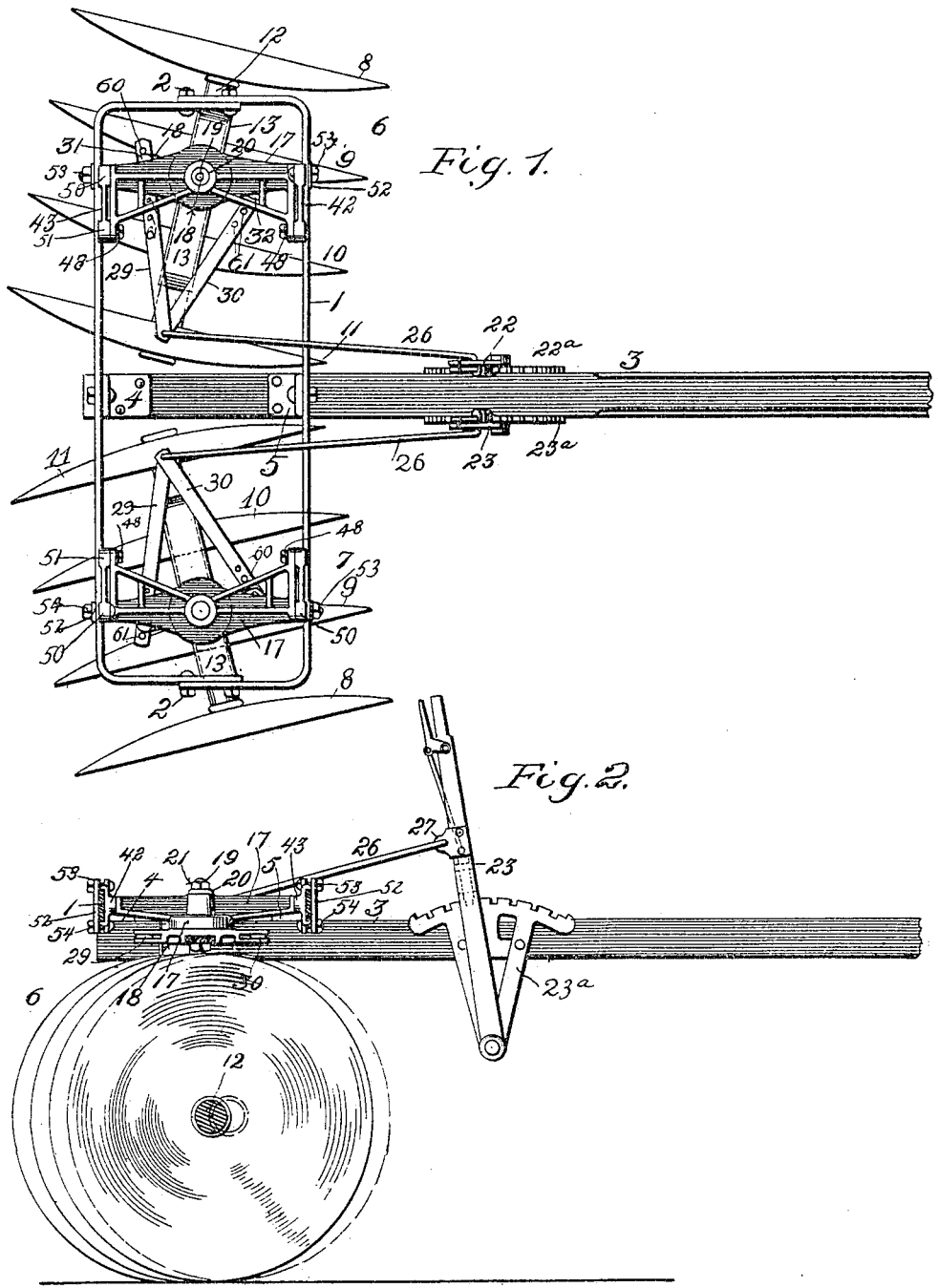

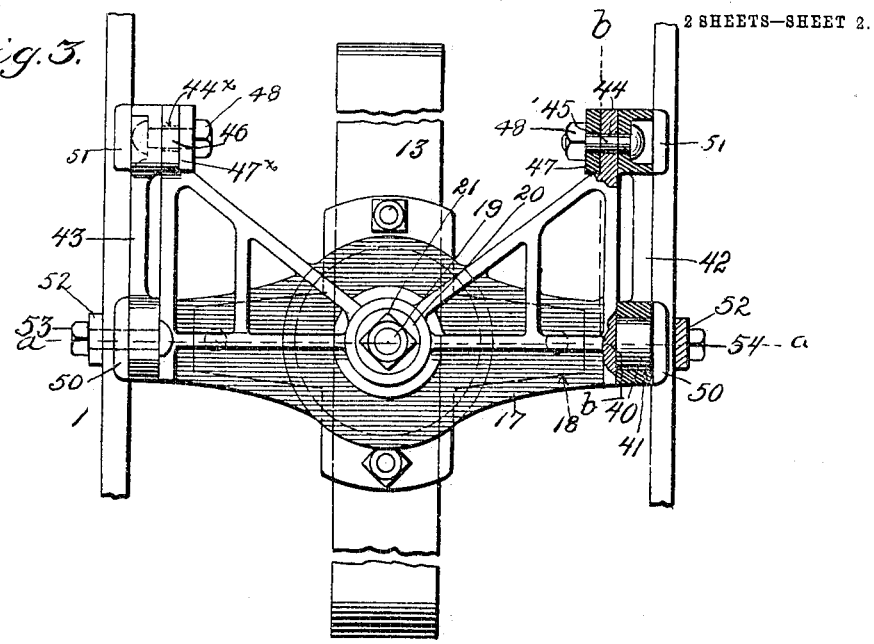
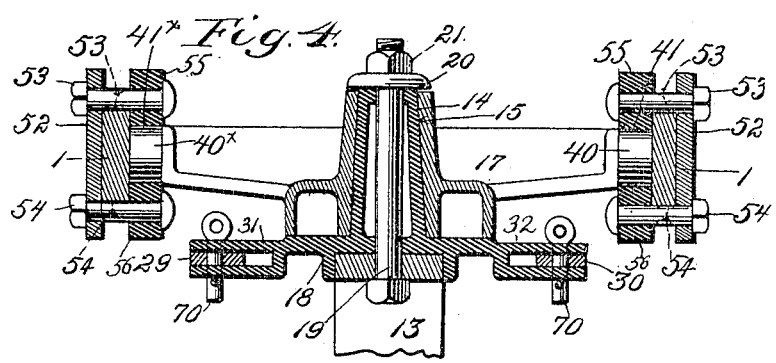
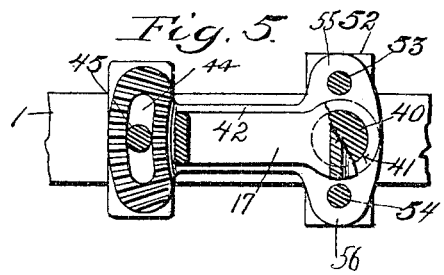

ALEXUS C. LINDGREN, OF MOLINE, ILLINOIS, ASSIGNOR TO THE MOLINE PLOW COMPANY, A CORPORATION OF ILLINOIS.

DISK HARROW.

No. 799,012.  Specification of Letters Patent.  Patented Sept. 5, 1905.

Application filed August 27, 1904. Serial No. 222,425.

*To all whom it may concern:*

Be it known that I, ALEXUS C. LINDGREN, of Moline, county of Rock Island, and State of Illinois, have invented a new and useful Improvement in Disk Harrows, of which the following is a specification.

This invention relates to disk harrows and cultivators of the type embodying a suitable sustaining-frame equipped with gangs of disks; and the invention consists of various improvements designed to render the machine available as a harrow or cultivator for use in orchards or elswhere for cultivating corn, cotton, and other plants.

The said improvements are especially directed to the manner of mounting the disk gangs in the frame and the means for effecting their various adjustments, whereby the gangs may be caused to "throw" either in or out or set to "bed-up" the soil when operating over the rows of plants and otherwise adjusted to meet the varying conditions encountered in the use of the machine in the field.

In the accompanying drawings, Figure 1 is a top plan view of my improved machine. Fig. 2 is a side elevation of the same, partly in section. Fig. 3 is a plan view, on an enlarged scale, of one of the saddle-plates and disk-yokes, parts being in section to show how the adjustment of the gangs is effected. Fig. 4 is a vertical transverse section through the same on the line $a\ a$ of the preceding figure. Fig. 5 is a sectional elevation on the line $b\ b$ of Fig. 3.

Referring to the drawings, 1 represents a horizontal transversely-elongated frame consisting of two ⌐-shaped sections of steel bar fastened together at their ends by means of bolts 2, thus forming a rectangular structure which is firmly fastened on edge to the rear end of a tongue 3 on its upper side by means of bracket-plates 4 and 5, bolted firmly to the tongue and the frame-bars. Sustained by this frame are two disk gangs 6 and 7, one on each side of the tongue and each consisting in the present instance of four disks 8, 9, 10, and 11, journaled on an axle 12, mounted in the lower end of a ∩-shaped yoke 13, having its upper horizontal portion provided with a vertical conical trunnion 14, which is mounted loosely in a correspondingly-formed socket 15 in the center of a saddle plate or casting 17, extending between and secured to the bars of the frame in the manner to be more fully described hereinafter.

In the present instance the trunnion is formed as a separate part from the yoke, and it consists of a horizontal body portion 18, recessed on its under side to receive the yoke, from which body portion the trunnion proper rises and extends through the socket 15, which parts are connected together by means of a vertical through-bolt 19, passed upward through the yoke and trunnion and beyond the upper end of the latter, where it has applied to it a washer 20 and confining-nut 21, the said bolt thus serving to hold the parts together while permitting the yoke and the gangs to rotate around a vertical axis. The purpose of this construction is to admit of the disk gangs being reversed or turned entirely around in order to throw the soil in or out and to admit of the adjustment of the gangs to vary the angle of the disks to the line of travel. This latter adjustment of the disk gangs is effected by two hand-levers 22 and 23, one for each gang, which levers are pivoted at their lower ends some distance below the tongue on the lower ends of two segment-frames 22ª and 23ª, fixed, respectively, to the opposite sides of the tongue, as shown in Figs. 1 and 2, and extending downward, so as to bring the levers down as far as possible in order that there will be no danger of stripping the foliage when cultivating in orchards. The upper ends of these frames are each provided with teeth adapted to be engaged by a latch or dog on the lever in order to lock the lever in position to hold the disk gang at the proper inclination. Extending rearward from the lever is a connecting-rod 26, having its front end bent laterally to form a finger, which is seated in a socket in a plate 27 on the lever, and its rear end bent downwardly and passed through holes in the inner ends of two straps or links 29 and 30, which diverge and have their opposite ends detachably connected with arms 31 and 32, respectively, extending outward from the horizontal body portion 18 at the base of the trunnion 14.

As a result of the construction described the disk gangs may be adjusted on a vertical axis by the hand-levers to different inclinations with respect to the line of travel, the operation of the lever through the medium of the connecting-rod 26 and links 29 and 30 causing the trunnion 14 to turn in the socket 15 in the saddle-plate and resulting in the corresponding movement of the disk gangs attached to the trunnion.

The reversal of the disk gangs is effected by first disconnecting the ends of the links 29 and 30 from the arms 31 and 32, after which the gang may be turned entirely around in the saddle-plate to its reverse position, whereupon the links are again connected with the arms.

I propose in addition to the adjustment described to provide for adjusting the gangs to and from each other and also for setting the inner ends of the gangs higher or lower. I prefer to effect these adjustments by the construction represented particularly in Figs. 3, 4, and 5, where it will be seen that each saddle-plate is widened at its ends and provided at its outer side on its ends with trunnions 40 and $40^\times$, seated in sockets 41 and $41^\times$ in the inner sides of two plates 42 and 43 at the outer ends of said plates, which latter are connected, respectively, with the front and rear bars of the frame of the machine in the manner presently to be described. At its inner side the saddle-plate is slotted at its two ends, as at 44 and $44^\times$, to receive bolts 45 and 46, fixed to the plates 42 and 43, respectively, and extending inwardly therefrom. The slots are curved in the arc of a circle described from the trunnions as centers, so that the saddle-plates may be rocked on an axis passing through the trunnions and in this way tip the inner end of the disk gang up or down, as described. After being adjusted to the proper position the plate is held by means of roughened washers 47 and $47^\times$, applied over the bolt against the roughened face of the saddle-plate around the slot and confined by a nut 48, screwed on the end of the bolt. From this construction it will be observed that the gangs are mounted in the frame so as to rock or turn bodily on a horizontal fore-and-aft axis with the result that the gangs may be tipped or inclined upward at their inner ends in order to bed-up the soil when operating over the row of plants.

The adjustment of the two gangs to and from each other is effected by clamping the two plates 42 and 43 to the frame-bars in such manner that they may be slid along the bars and held firmly at the desired point. This is accomplished conveniently by forming on the upper and lower edges of the plates guiding-lugs 50 and 51, which bear along the edges of the frame-bars, and clamping the plate to the frame-bar by means of a vertical clamp-clip 52, applied to the outer side of the frame-bar and connected with the plate by two horizontal bolts 53 and 54, extending, respectively, above and below the bar through the ends of the clip and through perforated lugs 55 and 56, projecting from the plate at the outer side.

In order to provide for the connection of the rear end of the rod 26 with the ends of arms 31 and 32 through the medium of the links 29 and 30, notwithstanding the change in the distance between these points due to the adjustment of the gang transversely along the frame, the connection of the links and arms is made adjustable by forming in the links a number of holes 60 61, &c., through which and the ends of the frames detachable fastening-pins 70 are passed.

It will be observed that in my improved machine the frame is set down close to the disks and the operating-levers are pivoted at their lower ends a considerable distance below the tongue or frame, which arrangement of the parts reduces the height of the machine as a whole to a minimum, thus admirably adapting it for use in orchards where the foliage of the trees closely overhangs the ground.

Having thus described my invention, what I claim is—

1. In a disk harrow, the combination with a frame, of a disk-yoke mounted thereon and movable horizontally around a vertical axis, a gang of disks carried by and movable with said yoke, a tongue extending forwardly from the frame, a segment-frame fixed to the tongue and extending downwardly below the same, a vertical hand-lever pivoted at its lower end to the lower extremity of the segment-frame, and a horizontal fore-and-aft connecting-rod joined at its forward end to the hand-lever at a point thereon above the tongue, and extending rearwardly above the frame of the machine and operatively connected with the disk-yoke.

2. In a disk harrow the combination of a horizontal flat frame member having front and rear frame-bars, a tongue connected at its rear end therewith, a saddle-plate extending between and sustained by the said frame-bars, a disk-yoke mounted in said saddle-plate to turn on a vertical axis, a plurality of disks carried by the yoke, a vertical hand-lever having a pivotal connection with the tongue at a point considerably below the same, a horizontal connecting-rod jointed at its front end to the lever above the tongue and extending rearwardly above and close to the front frame-bar, and connections extending transversely from the rear end of said rod outward to the disk gang.

3. In a disk harrow, the combination with the frame, of a disk gang adjustable with relation to the frame transversely of the line of draft, and movable around a vertical axis, a hand-lever mounted on the frame in advance of the disk gang, and rearwardly-extending connections between the hand-lever and disk gang for turning the latter on its vertical axis, said connections being adjustable at the rear end relatively to the disk gang in the direction of the transverse adjustment of the gang.

4. In a disk harrow the combination with the frame, of a disk gang adjustable therein transversely of the line of travel, and movable around a vertical axis, a hand-lever movable longitudinally, a connecting-rod extending longitudinally rearwardly therefrom, and adjustable connections between the rod and disk gang.

5. In a disk harrow the combination with a frame, of a disk gang adjustable therein transversely of the line of travel and mounted to turn on a vertical axis, a hand-lever for controlling said axial movement, a rod extending rearwardly from the hand-lever, and a link having its inner end jointed to said rod and its outer end connected adjustably with the disk gang.

6. In a disk harrow the combination with the frame, of a disk-yoke mounted therein to turn on a vertical axis and provided with horizontal arms, said yoke being adjustable bodily transversely of the line of travel, disks carried by the yoke, a hand-lever for controlling the axial movement of the yoke, a fore-and-aft horizontal connecting-rod jointed at its forward end to the hand-lever, and horizontal links having their inner ends jointed to the rear end of said connecting-rod, and their outer ends adjustably connected with the arms on the disk-yoke.

7. In a disk harrow the combination with the frame member having front and rear frame-bars, of a saddle-plate extending longitudinally of the machine between said bars and adjustable vertically around a fore-and-aft axis extending longitudinally of said plate, and provided with a vertical bearing-socket, a disk-yoke formed with a vertical trunnion seated in the socket, means for connecting said parts together, and disks carried by the yoke.

8. In a disk harrow the combination with the frame member having front and rear frame-bars, of opposing plates adjustable along said bars and provided in their inner adjacent sides with bearing-sockets, a longitudinally-extending saddle-plate formed with studs on its ends seated in the sockets; whereby the saddle-plate is movable around a fore-and-aft axis, means for holding the saddle-plate in its different adjustments around said axis, a disk-yoke carried by the saddle-plate, and disks mounted in said yoke.

9. In a disk harrow the combination with the front and rear frame-bars, of a horizontally-arranged saddle-plate sustained by said bars and rotatably adjustable at its outer end around a fore-and-aft axis extending longitudinally of the machine, a clamping device at the opposite end of the plate for holding it in its different adjusted positions, and a disk gang carried by the saddle-plate.

10. In a disk harrow the combination with the front and rear frame-bars, of opposing plates clamped to said bars, bolts extending inward toward each other from said plates at one end of the same, a saddle-plate pivoted at one end to the opposite ends of said plates, and provided with slots to receive the bolts, clamping-nuts applied to the bolts and adapted to hold the saddle-plate in its adjusted position, a disk-yoke mounted on the saddle-plate, and disks mounted in the yoke.

In testimony whereof I hereunto set my hand, this 16th day of August, 1904, in the presence of two attesting witnesses.

ALEXUS C. LINDGREN.

Witnesses:
C. H. LIPPINCOTT,
L. C. BLANDING.